(12) United States Patent
Miyamoto et al.

(10) Patent No.: US 7,792,125 B2
(45) Date of Patent: *Sep. 7, 2010

(54) SYSTEM FOR DYNAMIC PROVISIONING FOR SECURE, SCALABLE, AND EXTENSIBLE NETWORKED COMPUTER ENVIRONMENTS

(75) Inventors: Carleton Miyamoto, Santa Clara, CA (US); Chang Lin, Santa Clara, CA (US); William Blume, Santa Clara, CA (US); Jagadish Bandhole, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1260 days.

This patent is subject to a terminal disclaimer.

(21) Appl. No.: 11/334,012

(22) Filed: Jan. 18, 2006

(65) Prior Publication Data

US 2006/0114842 A1    Jun. 1, 2006

Related U.S. Application Data (63) Continuation of application No. 09/860,665, filed on May 18, 2001, now Pat. No. 7,027,412.

(60) Provisional application No. 60/247,119, filed on Nov. 10, 2000.

(51) Int. Cl.
 *H04L 12/56* (2006.01)
(52) U.S. Cl. ........................................ 370/400
(58) Field of Classification Search ............... None
 See application file for complete search history.

(56) References Cited

U.S. PATENT DOCUMENTS 4,925,311 A   5/1990   Neches et al. ............. 364/200

5,191,611 A   3/1993   Lang ......................... 380/25

(Continued)

FOREIGN PATENT DOCUMENTS

EP        745929  A1    12/1996

(Continued)

OTHER PUBLICATIONS

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

(Continued)

*Primary Examiner*—Anh-Vu Ly
(74) *Attorney, Agent, or Firm*—Campbell Stephenson LLP (57) ABSTRACT

A system and method for provisioning a virtual network is provided. Virtual networks can be automatically formed including switches in networks, such as local and private networks. Once the virtual networks are formed, virtual computing devices can be provisioned in place of physical computing devices that are connected to the switches. A system for provisioning a virtual network including a first virtual subnet and a second virtual subnet is provided. The system includes a first switch; a second switch; a first software process associated with first switch for provisioning the first virtual subnet; a second software process associated with the second switch for provisioning the second virtual subnet; and a communication link connecting the first switch and the second switch.

18 Claims, 4 Drawing Sheets

U.S. PATENT DOCUMENTS

| | | | |
|---|---|---|---|
| 5,394,522 A | 2/1995 | Sanchez-Frank et al. | 395/159 |
| 5,410,707 A | 4/1995 | Bell | 713/2 |
| 5,418,918 A | 5/1995 | Vander Kamp et al. | 713/2 |
| 5,452,454 A | 9/1995 | Basu | 713/2 |
| 5,463,766 A | 10/1995 | Schieve et al. | 713/2 |
| 5,479,599 A | 12/1995 | Rockwell et al. | 395/155 |
| 5,515,524 A | 5/1996 | Lynch et al. | 395/500 |
| 5,555,370 A | 9/1996 | Li et al. | 395/161 |
| 5,577,210 A | 11/1996 | Abdous et al. | 709/219 |
| 5,668,995 A | 9/1997 | Bhat | 395/674 |
| 5,694,600 A | 12/1997 | Khenson et al. | 713/2 |
| 5,727,213 A | 3/1998 | Vander Kamp et al. | 713/2 |
| 5,751,967 A | 5/1998 | Raab et al. | 709/228 |
| 5,802,290 A | 9/1998 | Casselman | 395/200.31 |
| 5,842,011 A | 11/1998 | Basu | 713/2 |
| 5,894,571 A | 4/1999 | O'Connor | 395/652 |
| 5,942,738 A | 8/1999 | Cesaire et al. | 235/380 |
| 5,948,101 A | 9/1999 | David et al. | 713/2 |
| 5,959,990 A | 9/1999 | Frantz et al. | 370/392 |
| 5,974,547 A | 10/1999 | Klimenko | 713/2 |
| 6,009,507 A | 12/1999 | Brooks et al. | 712/28 |
| 6,058,113 A | 5/2000 | Chang | 370/390 |
| 6,061,334 A * | 5/2000 | Berlovitch et al. | 370/255 |
| 6,081,846 A | 6/2000 | Hyder et al. | 709/250 |
| 6,081,864 A | 6/2000 | Lowe et al. | 710/129 |
| 6,085,318 A | 7/2000 | Vander Kamp et al. | 713/1 |
| 6,092,189 A | 7/2000 | Fisher et al. | 713/1 |
| 6,098,067 A | 8/2000 | Erickson | 707/10 |
| 6,101,601 A | 8/2000 | Matthews et al. | 713/2 |
| 6,182,123 B1 | 1/2001 | Filepp et al. | 709/217 |
| 6,182,275 B1 | 1/2001 | Beelitz et al. | 717/1 |
| 6,189,100 B1 | 2/2001 | Barr et al. | 713/182 |
| 6,202,091 B1 | 3/2001 | Godse | 709/222 |
| 6,230,200 B1 | 5/2001 | Forecast et al. | 709/226 |
| 6,259,448 B1 | 7/2001 | McNally et al. | 345/348 |
| 6,262,726 B1 | 7/2001 | Stedman et al. | 345/333 |
| 6,298,443 B1 | 10/2001 | Colligan et al. | 713/200 |
| 6,304,965 B1 | 10/2001 | Rickey | 713/2 |
| 6,308,238 B1 | 10/2001 | Smith et al. | 710/310 |
| 6,370,560 B1 | 4/2002 | Robertazzi et al. | 709/105 |
| 6,374,336 B1 | 4/2002 | Peters et al. | 711/167 |
| 6,393,557 B1 | 5/2002 | Guthridge et al. | 713/1 |
| 6,421,777 B1 | 7/2002 | Pierre-Louis et al. | 713/2 |
| 6,446,126 B1 | 9/2002 | Huang et al. | 709/226 |
| 6,463,530 B1 | 10/2002 | Sposato | 713/2 |
| 6,466,972 B1 | 10/2002 | Paul et al. | 709/222 |
| 6,466,978 B1 | 10/2002 | Mukherjee et al. | 709/225 |
| 6,473,411 B1 | 10/2002 | Kumaki et al. | 370/331 |
| 6,477,624 B1 | 11/2002 | Kedem et al. | 711/147 |
| 6,493,679 B1 | 12/2002 | Rappaport et al. | 705/29 |
| 6,498,791 B2 | 12/2002 | Pickett et al. | 370/353 |
| 6,512,526 B1 | 1/2003 | McGlothlin et al. | 345/762 |
| 6,516,417 B1 | 2/2003 | Pegrum et al. | 713/201 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,141 B2 | 6/2003 | Kelley et al. | 713/1 |
| 6,598,131 B2 | 7/2003 | Kedem et al. | 711/147 |
| 6,601,166 B1 | 7/2003 | Avyar et al. | 713/2 |
| 6,615,365 B1 | 9/2003 | Jenevein et al. | 714/6 |
| 6,631,416 B2 | 10/2003 | Bendinelli et al. | 709/227 |
| 6,633,916 B2 | 10/2003 | Kauffman | 709/229 |
| 6,662,267 B2 | 12/2003 | Stewart | 711/113 |
| 6,684,327 B1 | 1/2004 | Anand et al. | 713/2 |
| 6,711,688 B1 | 3/2004 | Hubacher et al. | 713/201 |
| 6,748,525 B1 | 6/2004 | Hubacher et al. | 713/1 |
| 6,751,729 B1 | 6/2004 | Giniger et al. | 713/53 |
| 6,757,837 B1 | 6/2004 | Platt et al. | 714/4 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,027,412 B2 * | 4/2006 | Miyamoto et al. | 370/255 |
| 7,058,700 B1 | 6/2006 | Casalaina | 709/220 |
| 7,065,637 B1 * | 6/2006 | Nanja | 713/1 |
| 7,082,521 B1 * | 7/2006 | Nanja | 713/1 |
| 7,278,142 B2 * | 10/2007 | Bandhole et al. | 709/217 |
| 7,620,069 B2 * | 11/2009 | Kompella | 370/469 |
| 2001/0011304 A1 | 8/2001 | Wesinger, Jr. et al. | 709/227 |
| 2002/0069369 A1 | 6/2002 | Tremain | 713/201 |
| 2003/0046390 A1 * | 3/2003 | Ball et al. | 709/224 |
| 2003/0046529 A1 | 3/2003 | Loison et al. | 713/2 |
| 2003/0165140 A1 * | 9/2003 | Tang et al. | 370/393 |
| 2004/0215481 A1 | 10/2004 | Nishi | 705/1 |

FOREIGN PATENT DOCUMENTS

EP  841616 A2  5/1998

OTHER PUBLICATIONS

Henry, Mike, Intel Corporation, *Extending PXE to Mobile Platforms*, Jun. 1998, pp. 1-4, http://www.intel.com/update/archive/psn/psn06985.pdf.

International Search Report as mailed from the PCT on Aug. 13, 2004 for WO Application (PCT/US03/28820; Filed Sep. 10, 2003), 3 pages).

Debenham, Clive, "Taos: The Operating System," May 29, 1995, Tantric Technologies, Newsgroups: comp.parallel.

Web Component, Using the Web Component, Copyright © 1997, Template Software, Inc.

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.

Sekaran Nanja, "User Interface for Dynamic Computing Environment Using Allocatable Resources," filed Sep. 15, 2000, U.S. Appl. No. 09/663,252, 27 pages of specification (including claims and abstract), and 5 sheets of drawings.

Sekaran Nanja, "System for Configuration of Dynamic Computing Environments Using a Visual Interface," filed Sep. 15, 2000, U.S. Appl. No. 09/662,990, 23 pages of specification (including claims and abstract), and 2 sheets of drawings.

* cited by examiner

SYSTEM FOR DYNAMIC PROVISIONING FOR SECURE, SCALABLE, AND EXTENSIBLE NETWORKED COMPUTER ENVIRONMENTS

CROSS-REFERENCES TO RELATED APPLICATIONS

This application is a continuation of U.S. patent application Ser. No. 09/860,665, entitled "SYSTEM FOR DYNAMIC PROVISIONING OF SECURE, SCALABLE, AND EXTENSIVE NETWORKED COMPUTER ENVIRONMENTS", filed May 18, 2001 now U.S. Pat. No. 7,027,412, and naming Carleton Miyamoto, Chang Lin, William Blume, and Jagadish Bandhole as inventors, which in turn claims the benefit of priority under 35 U.S.C. §119 from U.S. Provisional Patent Application No. 60/247,119 filed on Nov. 10, 2000. These applications are assigned to Veritas Operating Corporation, the assignee of the present invention, and are hereby incorporated by reference, in their entirety and for all purposes.

This application is related to U.S. Non-Provisional Patent Application entitled "User Interface for Dynamic Computing Environment Using Allocateable Resources" Ser. No. 09/663,252 filed on Sep. 15, 2000, page no. 1-27, FIGS. 1-5, U.S. Non-Provisional Patent Application entitled "System for Configuration of Dynamic Computing Environments Using a Visual Interface" Ser. No. 09/662,990 filed on Sep. 15, 2000, page no. 1-23, FIGS. 1-2, and U.S. Non-Provisional patent application Ser. No. 09/861,483 filed on May 17, 2001 entitled "Dynamic Computing Environment Using Remotely Allocable Resources", which are hereby incorporated by reference, as if set forth in full in this document, for all purposes.

FIELD OF THE INVENTION

The present invention relates in general to digital processing and more specifically to a system for dynamic provisioning of networked computing environments that are secure, scalable, and extensible.

BACKGROUND OF THE INVENTION

Networked computing environments have become the mainstay of computing in various ways: information sharing through local networks in office environments, distributed services based on multi-tier systems across an organization, and services hosted on the Internet. Each of these scenarios has varying demands on the networks in terms of functionality, performance, and security. This in turn has resulted in a multitude of hardware and software underlying these networks, a multitude of protocols and standards to interconnect these hardware and software, and a multitude of vendors and solutions supporting all of these. Given these variations, the logistics of creating, allocating, and maintaining a networked environment to meet a specific requirement can be daunting.

The high growth rate of the Internet has resulted in a corresponding growth in networking infrastructure. Logistical reasons such as space management, physical security, power distribution, and communication access have forced the infrastructure to be located in centralized Network Operation Centers (NOCs). These NOCs may be owned by the same organization that uses the infrastructure or by a service provider who hosts the infrastructure for one or more customer organizations. In contrast to this centralization, the modern workforce and its computing needs are increasingly distributed and mobile. As a consequence, the demands on the networking infrastructure vary widely and dynamically. These conflicting requirements have resulted in networking products such as switches, gateways, and firewalls that enable sophisticated solutions to problems like broadcast traffic isolation, remote access control, and secure data sharing. The solutions can be illustrated by techniques such as secure shell (SSH) or virtual private networks (VPNs).

Figure 2A:
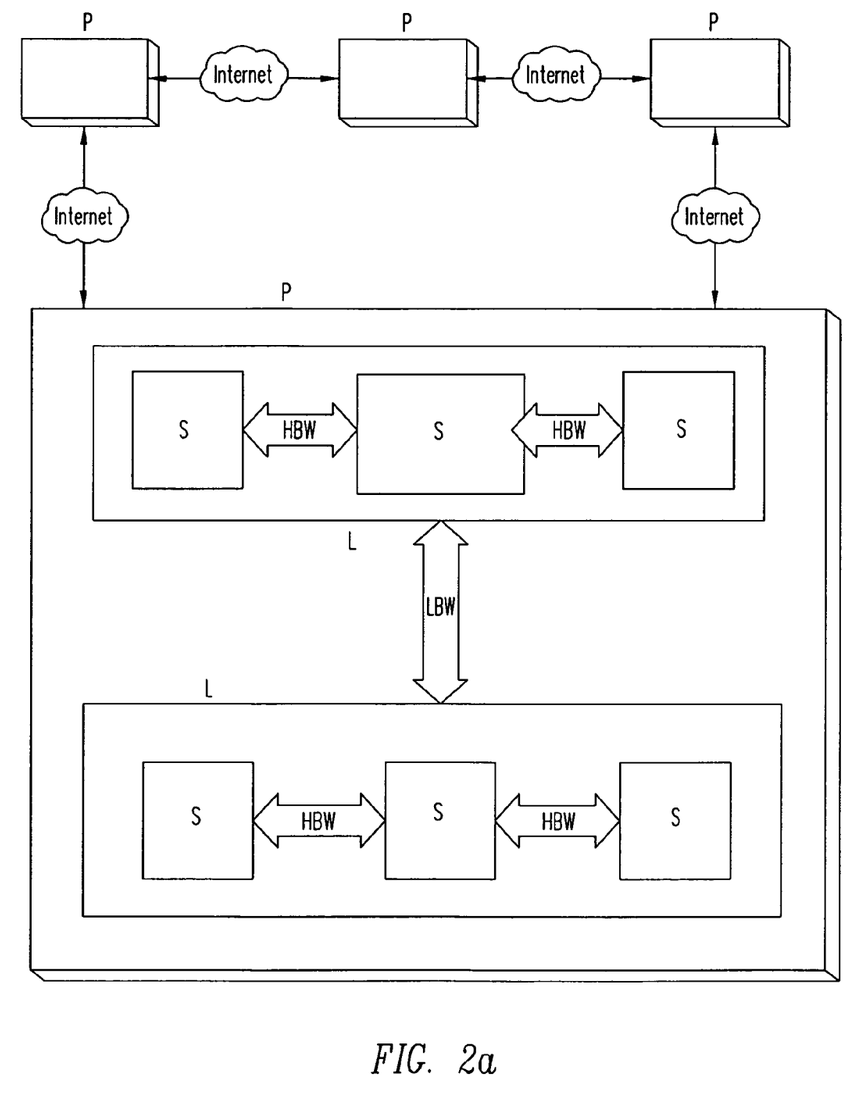
FIG. 2a illustrates typical network structure of a large organization (prior art).

A typical high-level network structure of any present day organization resembles the structure in FIG. 2a. Each L represents a Local Area Network (LAN). LANs are usually divided into sub-networks i.e., subnets, for reasons including administrative convenience, and broadcast traffic isolation. Typically each S represents a (physical) subnet associated with a single switch. (Within the context of FIG. 2a, S can refer to a (physical) subnet or a switch interchangeably). The physical network interconnections such as Ethernet cables are shared media i.e., broadcast media. For instance, all computing devices connected to a single Ethernet cable receive all the information transmitted by any one of the devices. A switch associated with a subnet, isolates traffic within the subnet from traffic outside the subnet. Thus each subnet is a broadcast domain i.e., a computing device within a subnet receives the network traffic of all other devices in the subnet, but the computing device does not receive any network traffic from outside the subnet unless it was specifically addressed to the device. Also, any traffic from one of the devices in the subnet will not be received by a device outside the subnet unless it was specifically addressed to that external device. As shown, switches (and hence subnets) are interconnected using High Bandwidth (HBW) connections, within a LAN. Multiple LANs are interconnected using Low Bandwidth (LBW) connections to form a single private network P. Network traffic to and from a private network is typically controlled by gateways and firewalls. Private networks are interconnected through the Internet.

Networks are manually created to address an organization's computing needs. For example, an organization may host a special event that requires a sudden need for additional computing power. A typical solution would include contacting a NOC to obtain the required computing power. The organization would request specific machines with specific operating systems ("OS"). Once receiving the request, an administrator at the NOC can physically pull the specified machines that already have the specified OS loaded on them from storage or any other location. If the operator cannot find a machine with the specified OS already loaded, the operator would then have to load the specified OS onto the machine. The operator can then physically and manually connect the specified computers to form a network for the organization.

Considering the above-mentioned structure in FIG. 2a, the operator would typically create a new subnet or a LAN with one or more subnets and interconnect the subnet(s) with the existing network(s) for the organization. Again this network creation process is manual and is tied to the physical locations of the switches and other computing devices.

If switches S were special switches referred to as VLAN (Virtual LAN) switches, then broadcast domains need not remain tied to physical subnets. Computing devices from different (physical) subnets can be connected to form a new broadcast domain—which is usually referred to as a virtual LAN i.e., VLAN. In other words VLANs separate the concept of a 'broadcast domain' from 'physical subnets'. VLANs are still restricted to private networks i.e., a broadcast domain can only be formed within a private network. In this new scenario, an organization's request for additional computing power can be met more easily than the previous scenario: computing devices can be added from other (physical) subnets to the existing infrastructure belonging to the organization. This relaxes the location-related constraints involved in incrementally adding computing devices to the network.

Thus, any system that combines the ability to automatically provision networked environments with the ability to program VLAN switches is desirable in its ability to provision networks that are scalable and extensible. Such networks are extensible because incremental addition is easy, automatic and it can be done remotely. They are scalable because the process of scaling will not be tied down by locations of switches and/or locations of computing devices.

Furthermore, private networks restrict external access using security mechanisms such as "firewalls". At the same time, they may enable selective user-level access to computing devices, and to processes running on these devices using special hardware and software. Since such user-level access extends a private network "virtually", these are referred to as "Virtual Private Networks (VPN)". Thus any system which can combine the ability to provision networks and the ability to work across private networks is desirable in provisioning networks that are not scalable and extensible but also secure.

SUMMARY OF THE INVENTION

A system and method for provisioning a virtual network is provided by virtue of the present invention. Virtual networks can be automatically formed including switches in networks, such as local and private networks. Once the virtual networks are formed, virtual computing devices can be provisioned in place of physical computing devices that are connected to the switches.

In one embodiment, a system for provisioning a virtual network including a first virtual subnet and a second virtual subnet is provided. The system includes a first switch; a second switch; a first software process associated with first switch for provisioning the first virtual subnet; a second software process associated with the second switch for provisioning the second virtual subnet; and a communication link connecting the first switch and the second switch.

In another embodiment, a system for provisioning a virtual network including a virtual subnet is provided. The system includes a first switch; a first software process associated with the first switch; a second switch; a second software process associated with the second switch; and a network connection that connects the first switch and the second switch, where the first software process communicates with the second software process through the network connection to provision the virtual subnet out of the first and second switches.

In another embodiment, a system for provisioning a "dynamic computing environment" (DCE), the DCE comprising one or more virtual computing devices and one or more virtual subnets that connect the one or more virtual computing devices is provided. The system includes one or more switches connected through a network connection; one or more physical computing devices connected to the switches; and one or more software processes associated with the switches for provisioning the one or more virtual subnets, where the one or more virtual subnets include the one or more virtual computing devices for the one or more physical computing devices.

In one embodiment, a method for creating a virtual network, the virtual network including a first virtual subnet and a second virtual subnet is provided. The method includes receiving a request to create the virtual network; and in response to receiving the request, causing a first software process to provision the first virtual subnet out of a first switch; causing a second software process to provision the second virtual subnet out of a second switch; and causing the first virtual subnet and the second virtual subnet to be part of the virtual network.

In another embodiment, a method for creating a virtual network including a first virtual subnet and a second virtual subnet is provided. The method includes receiving a request to create the virtual network; and in response to receiving the request, causing a software process to automatically provision the first virtual subnet out of a first switch; causing the software process to provision the second virtual subnet out of the first switch; and causing the first virtual subnet and the second virtual subnet to be part of the virtual network.

In another embodiment, a method for creating a virtual network including a first virtual subnet is provided. The method includes receiving a request to create the virtual network; and in response to receiving the request, causing a first software process associated with a first switch to communicate with a second software process associated with second switch to provision the first virtual subnet out of the first and second switches; and causing the first virtual subnet to be part of the virtual network.

A further understanding of the nature and advantages of the invention herein may be realized by reference of the remaining portions in the specifications and the attached drawings.

DESCRIPTION OF THE SPECIFIC EMBODIMENTS

One embodiment of the present invention allows fast, efficient selection and configuration of processing networks, which can then be accessed and managed remotely. The processing network is referred to as a system including "resources." A system resource is any hardware, software, or communication components in the system. For example, discrete hardware devices include processing platforms such as computers or processors, mobile/laptop computers, embedded computing devices, hand-held computers, personal digital assistants, point-of-sale terminals, smart-card devices, storage devices, data transmission and routing hardware etc., without limitation. Additionally, computer peripherals such as monitors, input/output devices, disk drives, manufacturing devices, or any device capable of responding to, handling, transferring or interacting with digital data are also resources. Software, or any other form of instruction, is executed by processors in the system and is also a type of resource. Finally, communication resources are also part of the system such as a digital network's hardware including the network's configuration and topology, where control of the network is provided by software and/or hardware. Additionally, the network may be based on wired connections or wireless connections. For instance, the network hardware and software may be based on Bluetooth wireless standards.

For example, a processing network of a general consumer might include a PDA and a cell phone, each connected by wireless channels to a single personal computer, which in turn is connected to an email server at a remote location through the Internet. As another example, a processing network might include a personal computer running Microsoft Windows 98 operating system, a lap-top computer running Linux operating system, and another personal computer running Windows NT operating system along with router and firewall software, wherein all three computers are connected using a local Ethernet hub, and the router software routes connections to the Internet.

According to an embodiment of the present invention, the resources for such a processing network are fully selectable and allocable by a system architect. In a specific embodiment, a primary company, Jareva Technologies, Inc.® provides proprietary technology to a system architect for designing a system by allocating resources and specifying how the resources are to be used. The system architect can be an individual, corporate entity, etc. The system is referred to as an "environment"—or more specifically as a "computing environment" and the primary provider of such an environment is referred to as an Environment Service Provider (ESP). A typical system architect is referred to as the "customer." The primary provider obtains revenue for providing the resources and the tools to easily select, allocate, configure and run the environment.

The specific embodiment of the present invention allows fast allocation and configuration of resources such that different environments can be created from the same resources within minutes, or even seconds. This allows "time sharing" of overall resources so that a first environment can be "alive" or operative for a time period defined by the system architect (e.g., daily two-hour slot), followed by second, third and fourth environments being instantly created for the next four hours for three different customers, and so on. After a time period expires, such environments might either manually or automatically de-allocate such resources. Since these "computing environments" can be dynamically configured and re-configured out of the same set of resources, these will also be referred to as "Dynamic Computing Environments".

In particular, environments without any computing devices i.e., environments made only of networks, will also be referred to as "virtual networked environments" or simply as "virtual networks".

A specific embodiment allows customers to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, be located anywhere in the world such that labor costs are optimized.

The creation of dynamic computing environments ("DCE") is automatic. For example, a customer can request a web-site simulator using twelve web-page servers on a Microsoft® NT platform, two disk arrays at a specific bandwidth and storage capacity, two caching servers and 200 clients running Netscape Navigator™ under Microsoft Windows® 2000 using Pentium III™ processors at under 800 MHz. Such an environment is created and destroyed, and even re-created automatically, without human intervention each time. Unlike the conventional computing infrastructure, according to an embodiment of the present invention there is no need to physically couple or de-couple, each physical machine or resource to each other upon adding or removing such resources. There is no need to set-up Internet Protocol (IP) addresses or other network settings, or install operating systems and associated application programs on one or more physical machines. All such activities on a DCE can be performed automatically without user intervention.

According to an embodiment of the present invention, the DCE is a virtual computing system including a network comprising a number of distinct types of machines and a network connecting them. For example, a system architect might require a DCE to include a Sun Sparc running a certain version of Solaris O/S coupled to a Linux machine. The present invention enables the separation of the activity of designing a DCE, from the activity of actually creating the DCE. Designing a DCE includes choosing the specific hardware, choosing the operating systems or other software, and choosing the specific interconnections, etc. Creating a DCE includes allocating the resources, installing the operating systems and other software, etc. Furthermore, the present invention automates the process of creating the DCE. A DCE for which resources have not been allocated yet will also be referred to as a virtual computing environment. Similarly, a computing device (or a subnet) that is part of a DCE will also be referred to as a virtual computing device (or a virtual subnet), if the required resources for the computing device (or the subnet) have not been allocated yet.

An embodiment of the present invention provides a framework that enables configuring, and provisioning DCEs remotely. Configuring a DCE involves choosing the resources and their interconnections. The present invention supports operations for making such design choices through appropriate programmable interfaces. The interfaces can be used interactively through a graphical user interface such as a web page or non-interactively through a program script. Provisioning a DCE involves allocation of physical resources required for a DCE to function. The present invention manages the physical resources needed for provisioning DCEs and supports operations for allocating/de-allocating these resources. In one embodiment of the present invention, the framework for provisioning DCEs is implemented as a distributed system consisting of different software programs running on different computers and networking hardware. In a further embodiment, the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure and provision DCEs.

A further understanding of embodiments of the present invention will be gained with reference to the diagrams and the descriptions that follow.

Figure 1:
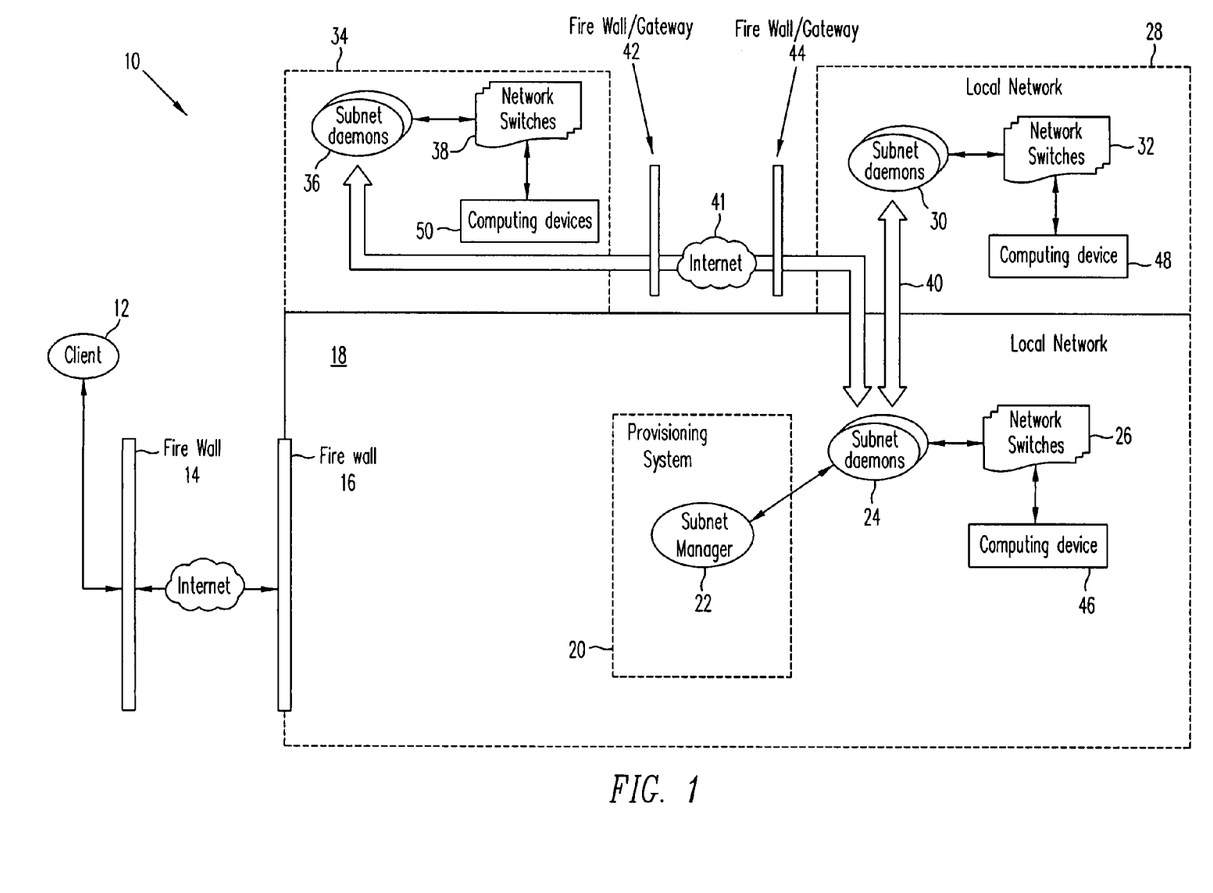
FIG. 1 illustrates a simplified system for provisioning virtual networks according to one embodiment.

FIG. 1 shows a system for provisioning networks 10 according to one embodiment. As shown, the system 10 includes a client 12, firewalls 14 and 16; a first local network 18 including a provisioning system 20 that includes a subnet manager 22, subnet daemons 24, and network switches 26; a second local network 28 including subnet daemons 30 and network switches 32; and a private network 34 including subnet daemons 36 and network switches 38. In one embodiment, the provisioning system can be a provisioning system as described in the patent application "Dynamic Computing Environment Using Remotely Allocable Resources", patent application Ser. No. 09/861,483. The first and second local networks 18 and 28 can be separated by a communication line 40, such as a low bandwidth connection. Additionally, the first and second local networks 18 and 28 can also be separated from the private network 34 by a communication line 41. In one embodiment, the communication line 41 can be the global internetwork of networks generally referred to as the Internet. Additionally, in one embodiment, the firewall/gateway 42 and the firewall/gateway 44 separate the first and second local networks 18 and 28 from the private network 34. Additionally, the communication lines 40 and 41 can include wireless or satellite communication channels.

In one embodiment, the first and second local networks 18 and 28 also form a private network. A private network is a network that contains administrative boundaries surrounding the network. The administrative boundaries govern traffic direction/redirection, traffic filtering inward and outward, and access control. Private networks allow devices within the private network to communicate freely with other devices in the network. However, communications to and from devices outside of the private network must go through an administrative boundary, such as a gateway, firewall, or virtual private network (VPN) switch. A gateway is primarily used for routing traffic originating from within a private network but intended to go outside the private network. A firewall primarily restricts incoming traffic to the private network. A VPN switch primarily authenticates incoming traffic so that users of the organization can access the private network from outside without violating the security of the network, which is usually protected by a firewall.

The local network 18, local network 28, and private network 34 can include a number of computing devices, such as servers, personal computers, workstations, personal digital assistants, etc; software processes, such as a subnet daemons and subnet managers; and network switches, such as VLAN and VPN switches. It should be understood that a person of ordinary skill in the art would know other components to include in a local and private network and other ways to implement a local and private network. Additionally, it should be understood that any combination of local and private networks can be included.

Subnet manager 22 is configured to receive delegated instructions from the provisioning system 20 and operates to allocate or de-allocate a subnet. A subnet is a portion of a network that shares a common address component, but need not share common physical network devices, such as switches. On TCP/IP networks, subnets are defined as all physical devices and machines whose IP addresses have the same prefix. For example, all physical devices with an IP address starting with 100.100.100 would be part of a single subnet. The present invention may use other networks instead of TCP/IP networks and hence other means of defining a subnet. Dividing a network into subnets is useful for both security and performance reasons, as is the case with the present invention. In one embodiment of the present invention, a virtual subnet represents a collection of IP addresses with the same prefix.

The subnet daemons 24, 30, and 36 are software processes capable of receiving a request to create a virtual network and also capable of communicating with a switch or with each other through a communication means, such as through a telnet protocol, or using a console or a serial port to provision the virtual network. Further, by communicating between subnet daemons, one subnet can be formed between multiple switches. In one embodiment, every switch can be associated with a different subnet daemon. In another embodiment, a subnet daemon can communicate with several switches or all the switches in a local or private network. In a specific embodiment, a subnet daemon is a process running on a Linux machine.

A virtual network can be provisioned using switches from any of the networks 18, 28, or 34. Depending on whether the network spans one or more network switches, the subnet manager may communicate to one or more subnet daemons and provision the virtual network using a cascade of switches. A virtual network can be formed by provisioning virtual subnets using any combination of switches 26, 32, and 36. Provisioning virtual subnets is independent of provisioning virtual computing devices.

Thus, in one example, a virtual network can be formed first without any computing devices. Later a DCE can be formed by adding virtual computing devices to the virtual subnets, and by provisioning the virtual computing devices out of physical computing devices that are connected to the switches used for provisioning the virtual subnets.

In another example, a virtual network can be formed with virtual subnets that include virtual computing devices. A DCE can then be formed by provisioning both virtual subnets and virtual computing devices. Virtual subnets are provisioned out of switches and virtual computing devices are provisioned out of physical computing devices connected to those switches.

Thus, in one embodiment, the subnet daemon 24 and the subnet daemon 30 can communicate to connect switches 26 and 32 in the local networks 18 and 28 to form the virtual network. Additionally, a virtual network can be provisioned to connect to switches 38. In this case, the switch 36 is located in a remote location and separated by an administrative boundary, such as firewalls and/or gateways 42 and 44. In order to maintain security protocols of the remote network, the subnet daemons can use a 'secure' version of the protocol, such as SSH. Thus, in the process of communicating with each other, subnet daemons may negotiate with filtering systems, routing systems, and/or access control mechanisms or systems such as firewalls, gateways, and VPN switches. The ability of subnet daemons to negotiate firewalls, gateways, and VPN switches enables the provisioned network to span different geographic locations and administrative boundaries. VPN switches are alternately referred to as VPN controllers or VPN terminators.

In one embodiment, the subnet daemons provision a virtual subnet by port grouping in a switch. Basically, a switch contains a group of ports that can be designed to be a virtual LAN. The grouping enables computers that are connected to the group of ports to form a broadcast domain. A broadcast domain is a collection of computers connected in a network so that the computers in the domain can receive each other's broadcast traffic but are isolated from broadcast traffic from computers not in the broadcast group. Additionally, it should be understood that a person skilled in the art would know other ways of forming a broadcast domain.

Further, the subnet daemons 24, 30, and 36 can communicate to automatically form a virtual subnet that spans a switch or one or more switches. For example, the virtual subnet can be formed between any combination of switches 26, 32, and 38. Thus, a virtual subnet can be formed including just one switch or switches 26 and 32, switches 26 and 38, switches 32 and 38, etc. Effectively, a broadcast domain can be formed that encompasses multiple switches and can span across geographic locations.

Figure 2B:
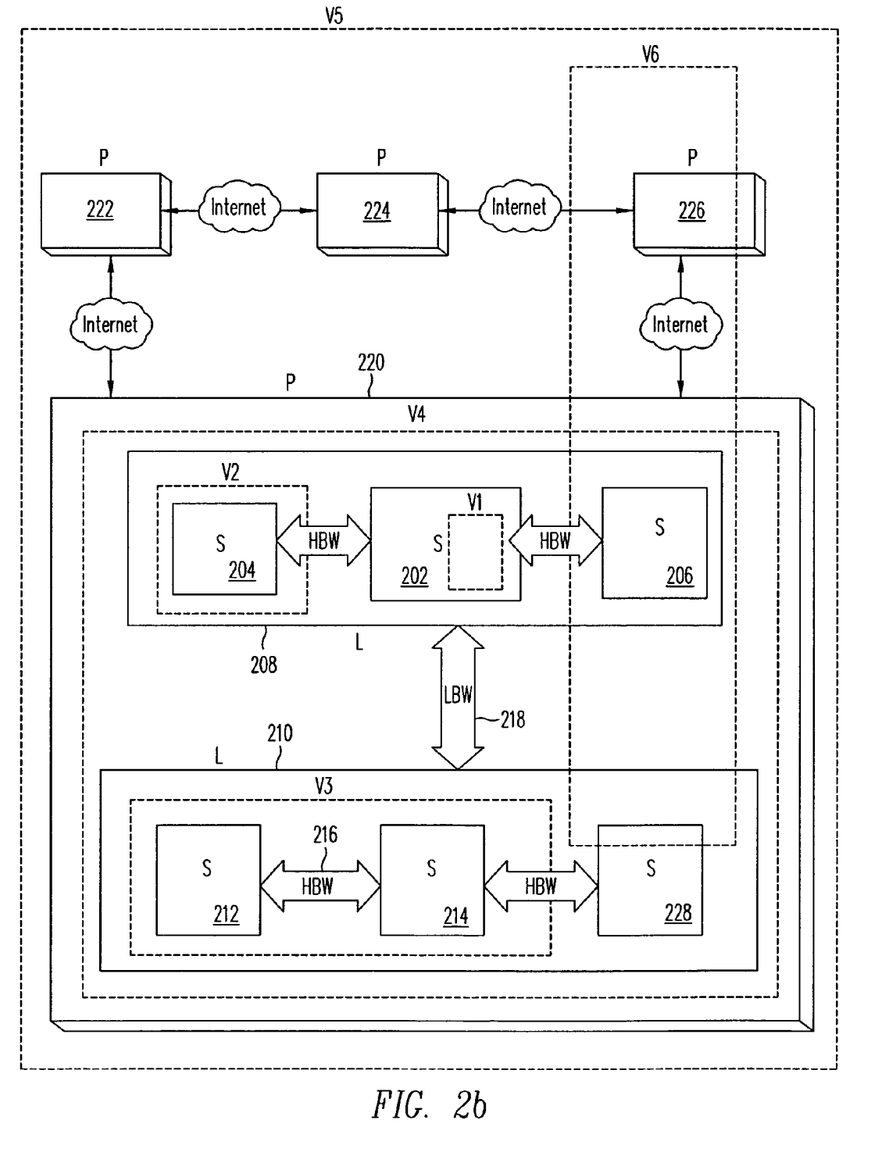
FIG. 2b illustrates different virtual localities that can be provisioned by one embodiment

FIG. 2b illustrates the different virtual 'localities' that can be provisioned using the provisioning system. In FIG. 2, the rectangular boxes with sharp corners represent physical network boundaries: each S represents a subnet associated with a single switch, each L represents a local network connecting multiple subnets using communication lines, such as High Bandwidth lines (HBW), and each P represents a private network (or an administrative boundary) containing multiple local networks connected by communication lines, such as Low Bandwidth lines (LBW). The private networks are interconnected on the Internet. As shown in FIG. 2, the rectangles with dotted corners represent the virtual networks that can be provisioned. These virtual networks may be chosen to have various localities. A 'locality', in this context, represents a broadcast domain, i.e., a group of computers that can receive each other's broadcast traffic but is isolated from other computers outside of the group.

For instance, the network V1 is provisioned from some but not all of the computers connected to a switch 202. The network V2 is provisioned from all computers connected to a switch 204. The network V3 is provisioned from all computers connected to one or more switches in the same local network 210. As shown, the network V3 encompasses all the computers in the switch 212 and all the computers in the switch 214. The switches are also connected by a high bandwidth connection 216. An example of a V3 network can be a network formed from switches located in the same building.

The network V4 is provisioned from all computers in one or more local networks within the same private network or administrative boundary. As shown, the local networks 208 and 210 form the network V4 and are connected by a low bandwidth connection 218. It should be understood that any number of computers connected to any of the switches in local networks 208 and 210 can make up the virtual network V4. An example of a V4 network can be by local network located in different buildings and separated by low bandwidth lines.

The network V5 is provisioned from all computers in one or more private networks interconnected through the Internet. As shown, private networks 220, 222, 224, and 226 form the virtual network V5. Private network 220 is connected to private networks 222 and 226 through the Internet. Additionally, private network 224 is connected to private networks 222 and 226 through the Internet. It should be understood that private networks can be inter-connected through the Internet in any way. For example, private network 224 can be connected to private network 220 through the Internet, a VPN, or any other communication means.

The network V6 is a logical collection of computers connected to different locations where some but not necessarily all of the computers in a given location are included in the network. For example, one V6 network may include some but not necessarily all computers connected to a switch, some but not necessarily all switches in a local network, and some but not necessarily all local networks in a private network. As shown, the network V6 includes some but not all computers of the private network 226, all of the computers connected to switch 206 in local network 208, and some but not all of computers connected to on switch 228 of local network 210.

Note also that the arrangements V4, V5, and V6 can scale across geographic locations whereas the arrangements V5 and V6 can scale across administrative boundaries. Additionally, the provisioning system can be configured as different embodiments where in each embodiment enables a combination of one or more of the localities (V1 to V6) mentioned above. For instance, one embodiment supports localities V1 to V4 and a variation of V6 restricted to a single private network. This embodiment is most suitable for provisioning networks that do not use the Internet for private traffic.

Figure 3:
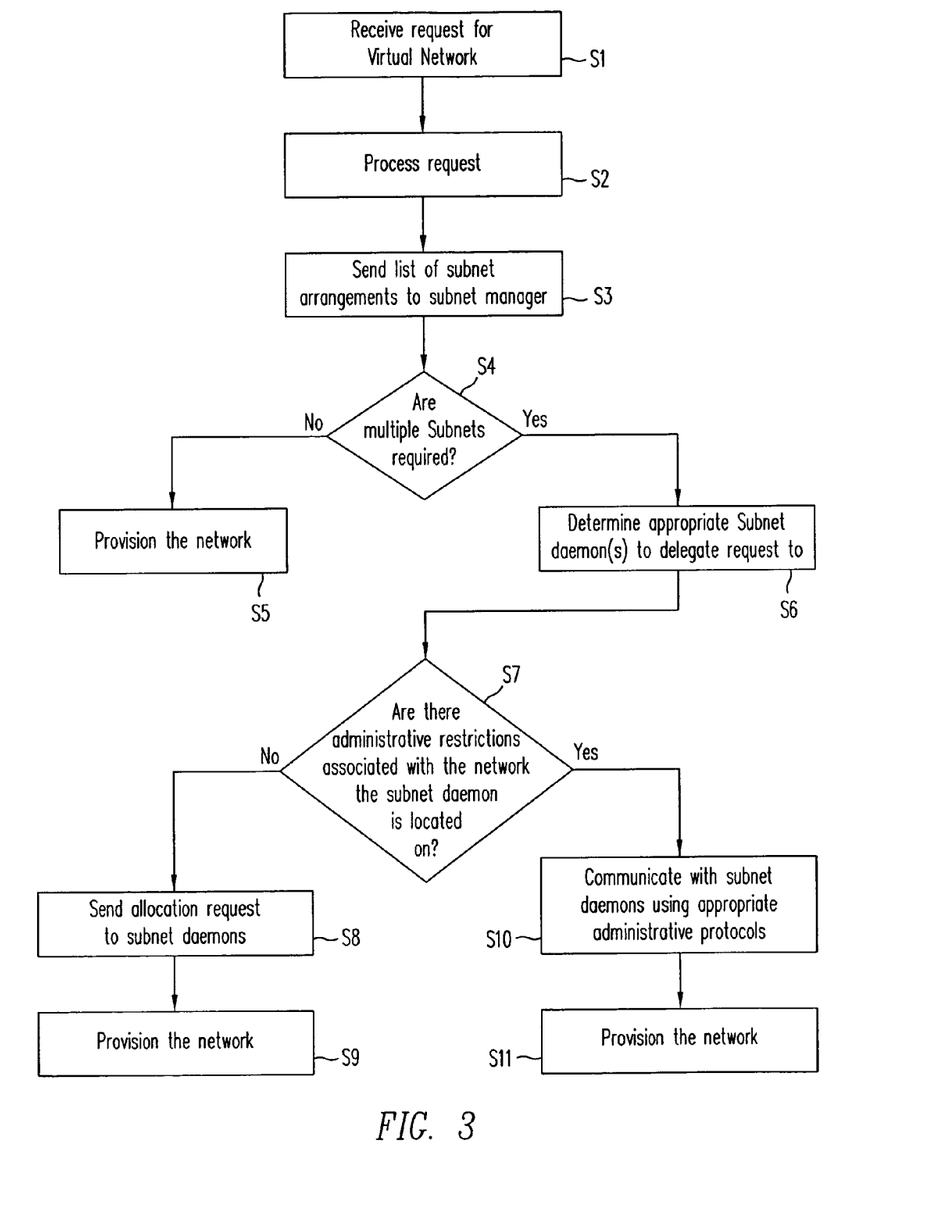
FIG. 3 illustrates a method of provisioning a virtual network according to one embodiment.

FIG. 3 illustrates a method of provisioning a virtual network according to one embodiment. Steps are represented by S1, S2, etc. in an order most likely to be carried out in this embodiment. A request for provisioning a virtual network is received from a client 12 (S1). The provisioning system 20 processes the request (S2) and passes a list of virtual devices and subnet arrangements to the subnet manager 22 (S3). Then, depending on the request, the subnet manager 22 determines if multiple subnets are required (S4). If multiple subnets are not required, the subnet manager can communicate to the appropriate subnet daemon(s) to provision the virtual network (S5). If multiple subnets are required, the subnet manager determines appropriate subnet daemon(s) where the request should be delegated (S6). For example, if the network spans multiple switches, as in the cases of the networks V3-V6, a subnet daemon responsible for each switch is contacted. The subnet manager 22 then determines if there are any administrative restrictions associated with the network the subnet daemons are located on (S7). If there are no restrictions, the subnet manager sends the allocation request to the subnet daemons (S8) and provisions the virtual network (S9). If there are restrictions, the subnet manager communicates with the subnet daemons using the appropriate administrative protocols (S10) and automatically provisions the virtual network (S11). It should be understood that there can be virtual subnets in the requested virtual network that have restrictions and other virtual subnets that do not have restrictions. In provisioning the network, the subnet daemons automatically create the virtual subnets. In one embodiment, the subnet daemons automatically group, regroup, or de-group ports associated with switches to form broadcast domains. Thus, the provisioning was done on demand or automatically.

Although the present invention has been discussed with respect to specific embodiments, these embodiments are merely illustrative, and not restrictive, of the invention. For example, an alternative embodiment may use IP-address based grouping instead of port grouping to create a VLAN. As another example, an alternative embodiment may use wireless connections and wireless switching devices instead of regular (wired) networks and switches. Furthermore, the provisioning system is not tied to any specific hardware or software vendor as long as the available components are enabled with the required functionality. For instance, VLAN switches from any vendor would suffice to provision subnets using this approach.

Thus, the scope of the invention is to be determined solely by the appended claims.

What is claimed is:

1. A computer-implemented method comprising:
    identifying a first broadcast domain, wherein said identifying is performed by the computer,
        a first virtual network comprises the first broadcast domain, and the first broadcast domain comprises at least one subnet; and
    dynamically provisioning the first virtual network, wherein said dynamically provisioning comprises the computer transmitting an allocation request to allocate the at least one subnets; and
    associating a first subnet daemon with a first subnet of the at least one subnets, wherein the first subnet daemon is configured to cause an associated network element to allocate the first subnet to the first virtual network.

2. The method of claim 1 further comprising:
    receiving a request to dynamically provision the first virtual network.

3. The method of claim 2 wherein the request to dynamically provision the first virtual network comprises:
    a network topography comprising a configuration of one or more broadcast domains including the first broadcast domain.

4. The method of claim 3 wherein the request to dynamically provision the first virtual network further comprises:
    a list identifying one or more virtual devices coupled by the desired network topography.

5. The method of claim 2 wherein the request to dynamically provision the first virtual network is provided by a programmable interface.

6. The method of claim 2 wherein the request to dynamically provision the first virtual network is provided by a graphical user interface.

7. The method of claim 1 wherein the associated network element comprises:
a processor configured to execute one or more instructions to allocate the first subnet to the first virtual network, wherein the first subnet daemon comprises the one or more instructions.

8. The method of claim 1 further comprising:
transmitting said allocation request for the first subnet to the first subnet daemon.

9. The method of claim 8 further comprising:
identifying an administrative restriction associated with the first subnet daemon; and
performing said transmitting said allocation request using an administrative protocol associated with the administrative restriction.

10. The method of claim 1 further comprising:
allocating a first dynamic computing environment (DCE) comprising
the first virtual network, and
a first set of computing devices coupled by the first virtual network.

11. The method of claim 10 further comprising:
de-allocating the first DCE; and
allocating a second DCE comprising
a second virtual network, and
a second set of computing devices coupled by the second virtual network.

12. The method of claim 11 wherein said deallocating the first DCE comprises performing said de-allocation after expiration of a defined period of time.

13. A system comprising:
a processor configured to identify a first broadcast domain, wherein a first virtual network comprises the first broadcast domain, and the first broadcast domain comprises at least one subnet, and
dynamically provision the first virtual network, wherein said dynamically provisioning comprises generating an allocation request to allocate the at least one subnets; and
a first network line card coupled to the processor and the at least one subnets and configured to transmit the allocation request to the at least one subnets; and
the processor further configured to identify a first subnet daemon associated with a first subnet of the at least one subnets, wherein the first subnet daemon is configured to cause an associated network element to allocate the first subnet to the first virtual network.

14. The system of claim 13 further comprising:
the processor further configured to receive a request to dynamically provision the
first virtual network, wherein
the request to dynamically provision comprises a network topography comprising a configuration of one or more broadcast domains including the first broadcast domain.

15. The system of claim 13 further comprising:
the first network line card further configured to transmit said allocation request to the first subnet daemon.

16. The system of claim 13 further comprising:
the processor further configured to allocate a first dynamic computing environment (DCE), wherein the first dynamic computing environment comprises
the first virtual network, and
a first set of computing devices coupled by the first virtual network.

17. The system of claim 16 further comprising:
the processor further configured to
de-allocate the first DCE; and
allocate a second DCL comprising
a second virtual network, and
a second set of computing devices coupled by the second virtual network.

18. An apparatus comprising:
means for identifying a first broadcast domain, wherein a first virtual network comprises the first broadcast domain, and the first broadcast domain comprises at least one subnet;
means for dynamically provisioning the first virtual network, wherein said dynamically provisioning comprises generating an allocation request to allocate the at least one subnets; and
a first network line card coupled to the at least one subnets and configured to transmit the allocation request to the at least one subnets; and
means for identifying a first subnet daemon associated with a first subnet of the at least one subnets, wherein the first subnet daemon is configured to cause an associated network element to allocate the first subnet to the first virtual network.

* * * * *